United States Patent
Bu et al.

(10) Patent No.: US 9,022,634 B2
(45) Date of Patent: May 5, 2015

(54) BACKLIGHT AND DISPLAY DEVICE

(75) Inventors: Zhanchang Bu, Beijing (CN); Bochang Wang, Beijing (CN); Fei Wang, Beijing (CN); Yanjun Sun, Beijing (CN); Yi Deng, Beijing (CN); Guangsheng Hua, Beijing (CN)

(73) Assignee: Beijing Boe Optoelectronics Technology Co., Ltd., Beijing ( * ) Notice: Subject to any disclaimer, the term of this patent is extended or adjusted under 35 U.S.C. 154(b) by 158 days.

(21) Appl. No.: 13/701,110

(22) PCT Filed: Jul. 20, 2012

(86) PCT No.: PCT/CN2012/078977
§ 371 (c)(1),
(2), (4) Date: Jan. 24, 2013

(87) PCT Pub. No.: WO2013/010507
PCT Pub. Date: Jan. 24, 2013

(65) Prior Publication Data
US 2013/0114298 A1 May 9, 2013

(30) Foreign Application Priority Data
Jul. 21, 2011 (CN) ............. 2011 2 0259561 U

(51) Int. Cl.
F21V 8/00 (2006.01)

(52) U.S. Cl.
CPC ............ *G02B 6/0073* (2013.01); *G02B 6/0028* (2013.01); *G02B 6/0055* (2013.01); *G02B 6/0078* (2013.01)

(58) Field of Classification Search
None
See application file for complete search history.

(56) References Cited

U.S. PATENT DOCUMENTS

| 2003/0058632 | A1 | 3/2003 | Maeda et al. |
| 2007/0139959 | A1 | 6/2007 | Yang |
| 2007/0147079 | A1 | 6/2007 | Wu et al. |
| 2012/0140443 | A1* | 6/2012 | Kim et al. ............... 362/97.1 |

FOREIGN PATENT DOCUMENTS

| CN | 1403858 A | 3/2003 |
| CN | 1991244 A | 7/2007 |
| CN | 101051153 A | 10/2007 |
| JP | 2008-034241 A | 2/2008 |
| JP | 4504119 B2 | 7/2010 |

OTHER PUBLICATIONS

International Preliminary Report on Patentability dated Jan. 21, 2014; PCT/CN2012/078977.

* cited by examiner

*Primary Examiner* — Ashok Patel
(74) *Attorney, Agent, or Firm* — Ladas & Parry LLP

(57) ABSTRACT

Embodiments of the present invention disclose a backlight and a display device, to reduce the number of LEDs in a backlight, save costs, while avoiding dark areas appearing on the screen, so as to ensure display effect. The backlight comprises a first light guide plate and at least one light-emitting diode assembly, and the light-emitting diode assembly is located on one side of the first light guide plate. The light-emitting diode assembly comprises a second light guide plate, at least one light-emitting diode and a reflective film, wherein the at least one light-emitting diode is located on at least one side of the second light guide plate, and the reflective film is located on at least one side of the second light guide plate.

8 Claims, 1 Drawing Sheet

BACKLIGHT AND DISPLAY DEVICE

TECHNICAL FIELD

An embodiment of the invention relates to a backlight and a display device.

BACKGROUND

In a liquid crystal display (LCD), because the liquid crystal layer itself has no function of light-emitting, it is necessary to provide a light source for the LCD to realize image display. In a transmissive type LCD, a backlight is used to provide a light source with a uniform luminance distribution for the liquid crystal layer.

In an existing backlight, generally, light-emitting diodes (LEDs) are used as light sources, and as the increase of the LED luminous efficiency, the number of light-emitting diodes used in a backlight is also gradually reduced. The configuration is from initially that two light bars with each consisting of a plurality of LEDs are respectively provided along two long sides of a glass substrate, developed to the case that one light bar consisting of a plurality of LEDs is provided along one long side of a glass substrate, and finally to the case that one light bar consisting of a plurality of LEDs is provided along one short side of a glass substrate, and thereby the number of LEDs used in a backlight is reduced.

FIG. 1 illustrates a schematic sectional view of a structure of a backlight module when an LED light bar is provided along a long side of a glass substrate. On a printed circuit board (PCB) 101, there is distributed an LED light bar formed by a plurality of LEDs 102. In the figure, a light guide plate 103 is located over the LEDs 102. In the backlight module, a back-plate is also comprised for fixing each assembly. Since the LED 102, as a spotlight source, has a limited light irradiation region, if too small number of LEDs 102 are employed in a backlight, there will exist a region on a light-incident surface of the light guide plate 103 that can not be irradiated by light, which will be prone to cause a dark area 105 appear on the screen corresponding to the backlight (i.e., the liquid crystal display screen), so that the luminance of the display screen is non-uniform, and thus display effect is adversely affected.

SUMMARY

Embodiments of the present invention provide a backlight and a display device, to reduce the number of LEDs in a backlight, save costs, and avoid dark areas appearing on a screen and to ensure display effect.

One embodiment of the present invention provides a backlight, which comprises: a first light guide plate and at least one light-emitting diode assembly, the light-emitting diode assembly is located on one side of the first light guide plate, and the light-emitting diode assembly comprises a second light guide plate, at least one light-emitting diode and a reflective film, wherein the at least one light-emitting diode is located on at least one side of the second light guide plate, and the reflective film is located on at least one side of the second light guide plate.

Another embodiment of the present invention provides a display device, which comprises a backlight as described above.

Based on the embodiments described above, it is possible to transform the spotlight source of a light-emitting diode into an area light source, and through a light-emitting surface of the area light to provide a uniform light source for the first light guide plate in the backlight, thereby avoiding a dark area appearing on the display screen, so as to ensure display effect; meanwhile, in the backlight, one or more than one light-emitting diode assemblies may be comprised to constitute the backlight, which can achieve the purpose of providing a light, while ensuring display effect, reducing the number of light-emitting diodes to a maximum extent, and saving costs.

BRIEF DESCRIPTION OF THE DRAWINGS

In order to clearly illustrate the technical solutions in the embodiments of the invention and in the prior art, the drawings of the embodiments will be briefly described in the following; it is obvious that the described drawings are only related to some embodiments of the invention and thus are not limitative of the invention.

DETAILED DESCRIPTION OF THE PREFERRED EMBODIMENTS

Below, specific implementations of the embodiments of the present invention will be further described in detail in connection with the accompanying drawings. It is obvious that the below-described embodiments are just a part but not all of the embodiments of the invention. Based on the embodiments of the present invention, those skilled in the art can obtain other embodiment(s), without any inventive work, which should be within the scope of the invention.

In order to reduce the number of LEDs in a backlight, save costs, while avoiding a dark area appearing on the screen, so as to ensure display effect, an embodiment of the present invention provides a backlight, which comprises a first light guide plate and at least one light-emitting diode assembly.

Below, a preferred embodiment of the present invention will be described in detail in connection with the accompanying drawings. In the following embodiments, the description will be given with an example in which the light-emitting diode assembly comprises two light-emitting diodes.

Figure 1:
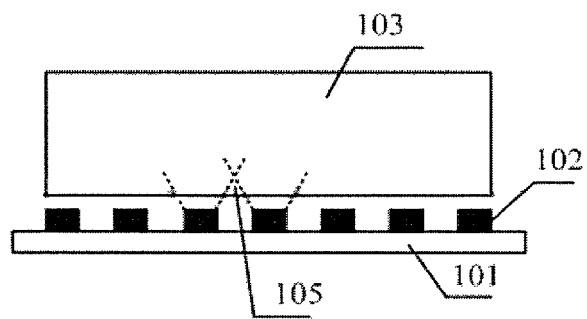
FIG. 1 is a schematic diagram of a structure of a backlight module in the prior art.
Figure 2:
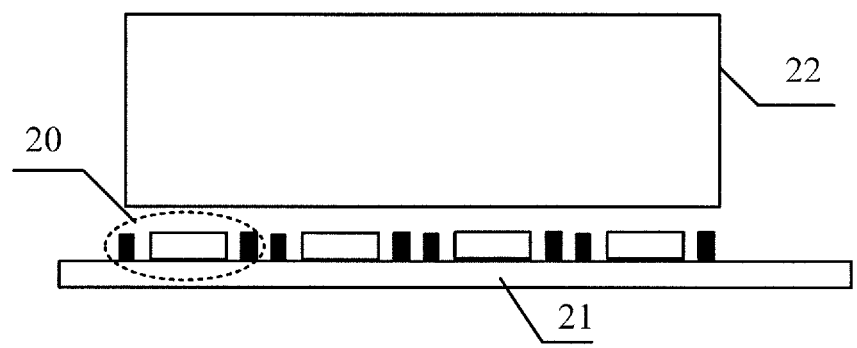
FIG. 2 is a schematic diagram of a structure of a backlight in an embodiment of the present invention.

As shown in FIG. 2, in this embodiment, the backlight comprises a first light guide plate 22 and at least one light-emitting diode assembly 20. The light-emitting diode assembly 20 is provided on at least one side of the first light guide plate 22. The backlight further comprises a printed circuit board 21, for carrying the at least one light-emitting diode assembly 20. The backlight shown in FIG. 2 is a side-emitting backlight, and the light-incident surface of the first light guide plate 22 is parallel to the plane of the drawing, and a reflective film may be further provided on a surface of the first light guide plate 22 opposite to the light-incident surface thereof.

Figure 3:
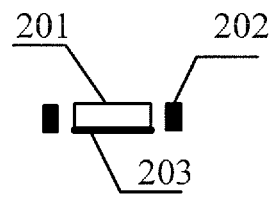
FIG. 3 is a schematic diagram of a structure of a light-emitting diode assembly in an embodiment of the present invention.

As shown in FIG. 3, the light-emitting diode assembly 20 comprises a second light guide plate 201, at least one light-emitting diode 202 and a reflective film 203. The at least one light-emitting diode 202 is located on at least one side of the second light guide plate 201, and the reflective film 203 is located on at least one side of the second light guide plate 201.

For example, the reflective film 203 and the light-emitting diode 202 are located on different sides of the second light guide plate 201.

For example, the reflective film 203 is fixedly connected on the bottom surface of the second light guide plate 201. For example, the reflective film 203 may be adhered on the bottom surface of the second light guide plate 201. Also for example, in the light-emitting diode assembly 20, two light-emitting diodes 202 are comprised and are located on opposite sides of the second light guide plate 201, respectively; for example, they are located on the left and right sides of the second light guide plate 201.

The light-emitting diode 202 is mounted on the printed circuit board 21, and for example welded on the printed circuit board 21. The reflective film 203 within the light-emitting diode assembly 20 is adhered and/or clamped on the printed circuit board 21, and the second light guide plate 201 is adhered and/or clamped on the reflective film 203 on the printed circuit board 21. Specifically, there are several ways to connect the reflective film 203 and the second light guide plate 201 onto the printed circuit board 21, and for example, the reflective film 203 and the second light guide plate 201 are adhered on the printed circuit board 21, or the printed circuit board 21 is provided with clamping slots, so that the reflective film 203 and the second light guide plate 201 are clamped onto the printed circuit board 21.

In this embodiment, when the backlight comprises two or more than two light-emitting diode assemblies 20, the two or more than two light-emitting diode assembly 20 are provided as a column and do not exceed a length of the light-incident surface of the first light guide plate 22, as shown in FIG. 2 and FIG. 3. In practical applications, at least one light-emitting diode assembly 20 may be provided along any long side or any short side of the first light guide plate 22.

In the backlight of this embodiment, in FIG. 2, the first light guide plate 22 is located above the light-emitting diode assembly 20. However, the figure only illustrates a kind of relative positional relationships, and when the backlight is placed horizontally, the first light guide plate 22 and the light-emitting diode assembly 20 are in the same plane. In addition, the backlight also may comprise a back-plate (not shown) to fix each assembly of the backlight.

In this embodiment, there is also disclosed a display device, which comprises a backlight as described above. The display device further comprises a display panel, and the backlight is provided behind the display panel, while the front of the display panel is used for displaying. The display panel may be a liquid crystal display panel.

Based on the technical solution of the embodiments described above, by providing a light-emitting diode assembly in a backlight, and the light-emitting diode assembly is constituted with a second light guide plate, at least one light-emitting diode and a reflective film; moreover, the at least one light-emitting diode is located on at least one side of the second light guide plate, and the reflective film is located on at least one side of the second light guide plate, it is thus possible to transform the spotlight source of the light-emitting diode into an area light source, and through a light-emitting surface of the area light to provide a uniform light source for the first light guide plate in the backlight, thereby avoiding a dark area appearing on the display screen, so as to ensure display effect. Meanwhile, in the backlight, one or more than one light-emitting diode assemblies may be comprised to constitute the backlight, which can achieve the purpose of providing a light, while ensuring display effect, reducing the number of light-emitting diodes to a maximum extent, and saving costs.

Obviously, the skilled in the art can make various alterations and modifications to the embodiments of the present invention, without departing from the spirit and the scope of the invention. Thus, in case that these alterations and modifications belong to the scope of the claims and their equivalents of the present invention, the embodiments of the invention are also intended to encompass these alterations and modifications.

The invention claimed is:

1. A backlight, comprising:
a first light guide plate;
two or more than two at light-emitting diode assemblies, which are located on one side of the first light guide plate, the light-emitting diode assembly comprising:
a second light guide plate;
at least one light-emitting diode; and
a reflective film,
wherein the at least one light-emitting diode is located on at least one side of the second light guide plate, and the reflective film is located on at least other side of the second light guide plate,
the two or more than two light-emitting diode assemblies are provided side by side as a column and each does not exceed a length of a light-incident surface of the first light guide plate.

2. The backlight according to claim 1, wherein the reflective film and the light-emitting diode are located on different sides of the second light guide plate.

3. The backlight according to claim 1, wherein the number of the at least one light-emitting diode is two, and the two light-emitting diodes are located on opposite sides of the second light guide plate.

4. The backlight according to claim 3, wherein the reflective film is located on a bottom surface of the second light guide plate perpendicular to the opposite sides.

5. The backlight according to claim 1, wherein the reflective film is provided on at least one lateral surface of the second light guide plate.

6. The backlight according to claim 1, wherein the backlight further comprises a printed circuit board, and the at least one light-emitting diode assembly is mounted on the printed circuit board.

7. The backlight according to claim 6, wherein the second light guide plate and the reflective film of the light-emitting diode assembly are adhered or clamped on the printed circuit board, and the light-emitting diode is welded or clamped on the printed circuit board.

8. A display device, comprising a backlight according to claim 1.

* * * * *